US012350706B2

(12) United States Patent
Ferreira-Duarte et al.

(10) Patent No.: US 12,350,706 B2
(45) Date of Patent: Jul. 8, 2025

(54) THIN FILM FABRICATION METHOD AND APPARATUS

(71) Applicant: UNIVERSITY OF NEWCASTLE UPON TYNE, Tyne and Wear (GB)

(72) Inventors: Ana Marina Ferreira-Duarte, Tyne and Wear (GB); Piergiorgio Gentile, Tyne and Wear (GB)

(73) Assignee: UNIVERSITY OF NEWCASTLE UPON TYNE, Tyne And Wear (GB)

( * ) Notice: Subject to any disclaimer, the term of this patent is extended or adjusted under 35 U.S.C. 154(b) by 53 days.

(21) Appl. No.: 17/771,205

(22) PCT Filed: Oct. 21, 2020

(86) PCT No.: PCT/GB2020/052641

§ 371 (c)(1),
(2) Date: Apr. 22, 2022

(87) PCT Pub. No.: WO2021/079106

PCT Pub. Date: Apr. 29, 2021

(65) Prior Publication Data

US 2022/0388024 A1 Dec. 8, 2022

(30) Foreign Application Priority Data

Oct. 24, 2019 (GB) ..................................... 1915463

(51) Int. Cl.
*B05B 7/00* (2006.01)
*B05D 1/00* (2006.01)
(Continued)

(52) U.S. Cl.
CPC .................. *B05D 1/02* (2013.01); *B05B 7/00* (2013.01); *B05D 1/005* (2013.01); *B05D 1/18* (2013.01); *B05D 1/36* (2013.01); *B05D 3/107* (2013.01)

(58) Field of Classification Search
None
See application file for complete search history.

(56) References Cited

U.S. PATENT DOCUMENTS 2,729,191 A * 1/1956 Ransburg ................ B05B 5/082 118/635
3,503,435 A * 3/1970 Dunlop ................ B22C 13/085 118/DIG. 5
(Continued)

FOREIGN PATENT DOCUMENTS

EP 2839886 A1 2/2015
EP 3 502 346 A1 6/2019
(Continued)

OTHER PUBLICATIONS

English translation of WO2008025498.*
(Continued)

*Primary Examiner* — Charles Capozzi
(74) *Attorney, Agent, or Firm* — Merchant & Gould P.C.

(57) ABSTRACT

A method of layer-by-layer deposition for thin-film fabrication and a layer-by-layer deposition apparatus for thin-film fabrication. The method comprises the steps of at least partially immersing a substrate in a reservoir of a charged solution to deposit a layer on the substrate and spraying the substrate with an atomized charged solution to deposit a layer on the substrate.

14 Claims, 12 Drawing Sheets

(51) Int. Cl.

| | |
|---|---|
| ***B05D 1/02*** | (2006.01) |
| ***B05D 1/18*** | (2006.01) |
| ***B05D 1/36*** | (2006.01) |
| ***B05D 3/10*** | (2006.01) |

(56) References Cited

U.S. PATENT DOCUMENTS

| | | | | |
|---|---|---|---|---|
| 3,705,817 | A * | 12/1972 | Durr | B05B 13/0264 427/403 |
| 4,170,488 | A * | 10/1979 | Norman | C23G 3/00 134/32 |
| 4,262,628 | A * | 4/1981 | Dukes | C25D 13/22 118/425 |
| 4,292,096 | A * | 9/1981 | Murakami | C23C 22/13 148/262 |
| 4,526,127 | A * | 7/1985 | Sippola | C23C 2/14 118/54 |
| 6,051,275 | A | 4/2000 | Lerch et al. | |
| 6,451,871 | B1 | 9/2002 | Winterton et al. | |
| 2001/0045676 | A1 | 11/2001 | Winterton et al. | |
| 2004/0170666 | A1* | 9/2004 | Keates | G02B 1/043 424/428 |
| 2008/0264195 | A1* | 10/2008 | Larsson | B25J 9/102 901/17 |
| 2010/0003499 | A1 | 1/2010 | Krogman et al. | |
| 2014/0079884 | A1 | 3/2014 | Krogman et al. | |
| 2017/0198165 | A1 | 7/2017 | Boday et al. | |
| 2017/0362693 | A1* | 12/2017 | Young | C23C 2/36 |

FOREIGN PATENT DOCUMENTS

| | | | | |
|---|---|---|---|---|
| GB | 2186214 | A | 8/1987 | |
| WO | WO 95/02251 | A2 | 1/1995 | |
| WO | WO 9502251 | A3 | 1/1995 | |
| WO | WO 0157118 | A2 | 8/2001 | |
| WO | WO 03/041754 | A1 | 5/2003 | |
| WO | WO 03035716 | A1 | 5/2003 | |
| WO | WO 2004071677 | A2 | 8/2004 | |
| WO | WO-2008025498 | A1 * | 3/2008 | B05C 3/04 |
| WO | WO 2012/075309 | A1 | 6/2012 | |
| WO | WO 2012112624 | A2 | 8/2012 | |
| WO | WO 2018032010 | A1 | 2/2018 | |

OTHER PUBLICATIONS

Paula T. Hammond, "Building biomedical materials layer-by-layer", materialstoday, May 2012, vol. 15, No. 5, 11 pages.

PCT International Search Report for PCT/GB2020/052641, mailed Jan. 29, 202, 4 pages.

PCT Written Opinion of the ISA for PCT/GB2020/052641, mailed Jan. 29, 2021, 7 pages.

PCT International Preliminary Report on Patentability for PCT/GB2020/052641, dated Apr. 26, 2022, 8 pages.

Search Report for GB 1915463.2 dated Apr. 24, 2020, 5 pages.

* cited by examiner

THIN FILM FABRICATION METHOD AND APPARATUS

RELATED APPLICATIONS

This application is a National Phase entry of PCT Application No. PCT/GB2020/052641 filed Oct. 21, 2020, which application claims the benefit of priority to GB Application No. 1915463.2, filed Oct. 24, 2019, the entire disclosures of which are incorporated herein by reference.

The present invention relates to a thin film fabrication method and apparatus. In particular, but not exclusively, the present invention relates to a method of layer-by-layer (LbL) deposition for thin film fabrication and an apparatus for performing the method.

BACKGROUND

Traditionally, there are various methods for applying LbL coatings to a surface; dip coating is one such method. For dip coating, a pre-charged substrate to be coated is dipped into a reservoir of charged solutions. As the substrate is dipped into the reservoir of charged solution the layer is formed by electrostatic interaction between substrate and charged solution. The process is repeated until the desired number of layers is achieved.

Dip coating is one of the most widely used layering methods largely due to the simplicity of the immersive methodology. Only a charged solution and substrate are required to carry out a layering sequence. However, dip coating is a time consuming process. The kinetics of the molecules means it takes a long time to build up a layer. This is because the time required to reach equilibrium adsorption for each coating step is relatively high compared to other techniques. Additional layers cannot be added until the existing layer has stabilised. For example, it can take two days to form 400 layers.

An alternative method for applying a LbL coating to a substrate is spin coating. In spin coating, a liquid is deposited and spread across a planar surface through rapid spinning of the substrate. Spin coating involves the rapid evaporation of solvent from the coating material, leading to the formation of films that are thicker than those resulting from the dipping technique. However, for spin coating it is difficult to homogenously coat irregularly shaped 2D substrates and impossible to coat 3D substrates.

Another method for LbL deposition is spray coating. Spray coating includes spraying a solution, generally an atomized solution, on a substrate. During spray coating, the substrate is typically fully enclosed within a housing to prevent the solution entering the surrounding environment. Spray coating does not provide a consistent homogeneous and stable layer every time. Moreover, there is a significant amount of wasted solution that does not attach to the substrate. This can greatly increase the costs associated with fabricating the thin-film.

Spray coating and dip coating are very different techniques. The main difference is the depletion zone (or layer). The depletion zone is an area that is formed over the surface that can delay the absorption of the polyelectrolytes. The depletion zone is more present in the dip coating compared with the spray coating the where depletion zone is negligible. Therefore in the dip coating the polyelectrolytes need more time to reach the surface and start to interact. The depletion zone is formed during the layer-by-layer assembly because of hydrodynamic phenomena that prevent the whole rinsing solution being replaced instantaneously up to the deposition surface and because of the gradual depletion of the charged solution by adsorption on the surface.

The depletion zone is expected to vary in thickness and to possess a gradient of charged concentration which would essentially be zero close to the surface and increasing toward the free solution. The chains of the charged solutions then have to diffuse through this depletion zone before reaching the surface.

In the dipping LbL the charged deposition system takes typically several tens of seconds or even minutes before the adsorption becomes homogeneous over the whole surface and the adsorption process becomes well-controlled. Therefore, frequently deposition times are on the order of 15 to 20 min.

On the other hand, in spray LbL as a result of arriving spray droplets and drainage, the depletion zone that should form close to the deposition surface and the diffusion of the adsorbing species through this zone should only play a minor role, if any. This is in marked contrast to the dipping method.

US2010/003499A1 discloses an automated apparatus capable of spray depositing charged solutions in a Layer-by-Layer mechanism.

WO2012/075309 discloses an apparatus and method for formation of LbL materials. The apparatus includes a spinning disc or substrate, with a plurality of atomizing nozzles directed to the spinning disc or substrate.

It would be useful to provide a method which provides a stable and homogeneous LbL application whilst reducing the time taken for application.

SUMMARY OF THE INVENTION

According to a first aspect of the present invention there is provided a method of layer-by-layer deposition for thin-film fabrication, the method comprising the steps of:

- at least partially immersing a substrate in a reservoir of a charged solution to deposit a layer on the substrate; and
- spraying the substrate with an atomized charged solution to deposit a layer on the substrate.

Suitably the charged solution in the reservoir is a polyelectrolyte solution.

Suitably the atomized charged solution is a polyelectrolyte solution or a biological material.

Suitably the method further comprises the step of immersing the substrate in a further reservoir of charged solution to deposit a further layer on the substrate.

Suitably the method further comprises the step of spraying the substrate with a further atomized charged solution to deposit a further layer on the substrate.

Suitably the layer deposited by at least partially immersing the substrate in the reservoir is of opposite charge to the layer deposited by spraying the substrate.

Suitably the method further comprises the step of atomizing a portion of the charged solution in an spray assembly, before spraying the substrate.

Suitably the time period for a spray step is from 2 to 10 seconds.

Suitably the time period for an immersion step is from 5 to 15 minutes.

Suitably the method further comprises at least one washing step, the at least one washing step comprising washing the substrate to remove excess charged solution.

Suitably the at least one washing step comprises immersing the substrate in a rinsing bath, or spraying the substrate with a rinsing solution.

Suitably the at least one washing step is performed after immersing the substrate in the charged solution or further charged solution; and/or after spraying the substrate with the charged solution or further charged solution.

Suitably the method further comprises rotating the substrate as the substrate is sprayed with the atomized charged solution and/or further atomized charged solution.

Suitably the method further comprises providing an apparatus as detailed in the second aspect below.

According to a second aspect of the present invention there is provided a layer-by-layer deposition apparatus for thin-film fabrication, the apparatus comprising;

a substrate holder for holding a substrate;

a spray assembly for spraying an atomized charged solution; and a reservoir for containing a charged solution, wherein the substrate holder is movable between a spraying position and an immersed position, wherein in the spraying position the substrate holder positions the substrate substantially adjacent the spray assembly to allow the substrate to be sprayed with the atomized charged solution, and wherein in the immersed position the substrate holder at least partially immerses the substrate within the reservoir.

Suitably the spraying position the substrate holder is positioned directly above the reservoir.

Suitably the apparatus further comprises a further spray assembly for spraying a further atomized charged solution wherein the substrate holder is movable to a further spraying position, wherein in the further spraying position the substrate holder positions the substrate substantially adjacent the further spray assembly to allow the substrate to be sprayed with the further atomized charged solution.

Suitably the apparatus comprises a further reservoir for containing a further charged solution wherein the substrate holder is movable to a further immersed position, wherein in the further immersed position the substrate holder at least partially immerses the substrate within the further reservoir.

Suitably the further charged solution is of opposite charge to the charged solution.

Suitably the apparatus further comprises an arm configured to move the substrate holder between the spraying position and the immersed position.

Suitably the apparatus further comprises a housing configured to enclose the spray assembly and the reservoir of the charged solution.

Suitably the housing is rotatable in relation to the arm.

Suitably the substrate holder is rotatable in relation to the arm.

Suitably the apparatus further comprises a controller, the controller configured to control the movement of the substrate holder.

Suitably the apparatus further comprises a rinsing bath and/or a rinsing nozzle for washing the substrate.

Suitably the apparatus further comprises a shield, the shield configured to prevent atomized charged solution escaping the housing.

Suitably the apparatus of the second aspect of the invention is used to carry out the first aspect of the invention.

Throughout the description reference is made to a "charged solution". Reference to a charged solution is intended to indicate a solution or suspension of charged molecules, for example a polyelectrolyte solution or a biomolecule suspension. The charged solution may be of positive or negative charge. The charged solution may be, for example, a solution of a polymer whose repeating units bear an electrolyte group resulting in an overall charge to the solution. Examples of suitable charged solutions include synthetic polymers, such as poly(sodium 4-styrene sulfonate), poly(allylamine hydrochloride) and poly(acrylic acid) or natural polymers, such as collagen, gelatine and chitosan and growth factors, antibodies, cells or carbon quantum dots. In this case the charged solution is poly (allylamine hydrochloride).

Throughout the description reference is made to a "deposited layer". Reference to a deposited layer is intended to indicate a material coating which forms on the surface of the substrate or on a previous layer already formed on the substrate. The layer may adhere to the intended surface via chemical bonding such as plasma-induced grafted polymerization or aminolysis treatment.

The inventors have surprisingly found that the combination of an immersion step and a spraying step reduces the time to reach equilibrium adsorption for each coating step. This, therefore, reduces the overall time taken to build up multiple layers without adversely affecting the film properties.

Although the immersion step is time consuming and lot of material is wasted, it enables thicker layers and additional coating features to be applied. As spray coating is much faster than dip coating, by including a spray step as one of the coating steps the overall time can be reduced. Therefore, combining a spray step and an immersion step allows for a stable and homogenous coating in reduced time.

Certain embodiments provide the advantage that stable, homogenous thin-films may be manufactured in a reduced time period compared to known methods.

Certain embodiments provide the advantage that layer by layer deposition can be performed on 3-dimensional substrates.

Certain embodiments provide the advantage that a method and apparatus of LbL disposition can be provided with a reduced associated cost.

BRIEF DESCRIPTION OF THE DRAWINGS

Examples of the invention are further described hereinafter with reference to the accompanying drawings, in which.

In the drawings like reference numerals refer to like parts.

DETAILED DESCRIPTION

The following examples relate to apparatus and methods for a LbL deposition technique in which the object is to achieve a LbL coating of a substrate by at least partially immersing the substrate in a charged solution and then performing a spraying of the substrate with an atomized charged solution. Each step results in a layer being deposited on the substrate, or on a previously deposited layer.

Figure 1A:
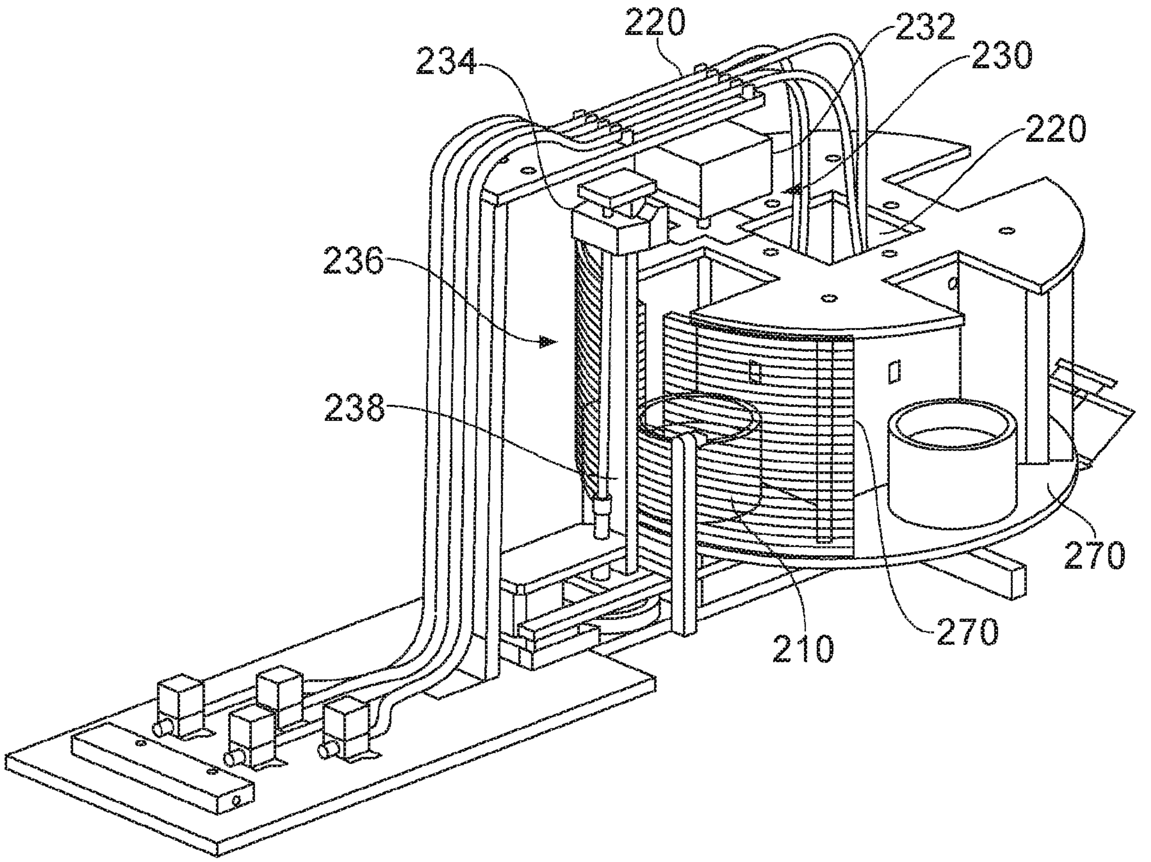
FIG. 1*a* illustrates an example of an apparatus for thin-film fabrication.
Figure 1B:
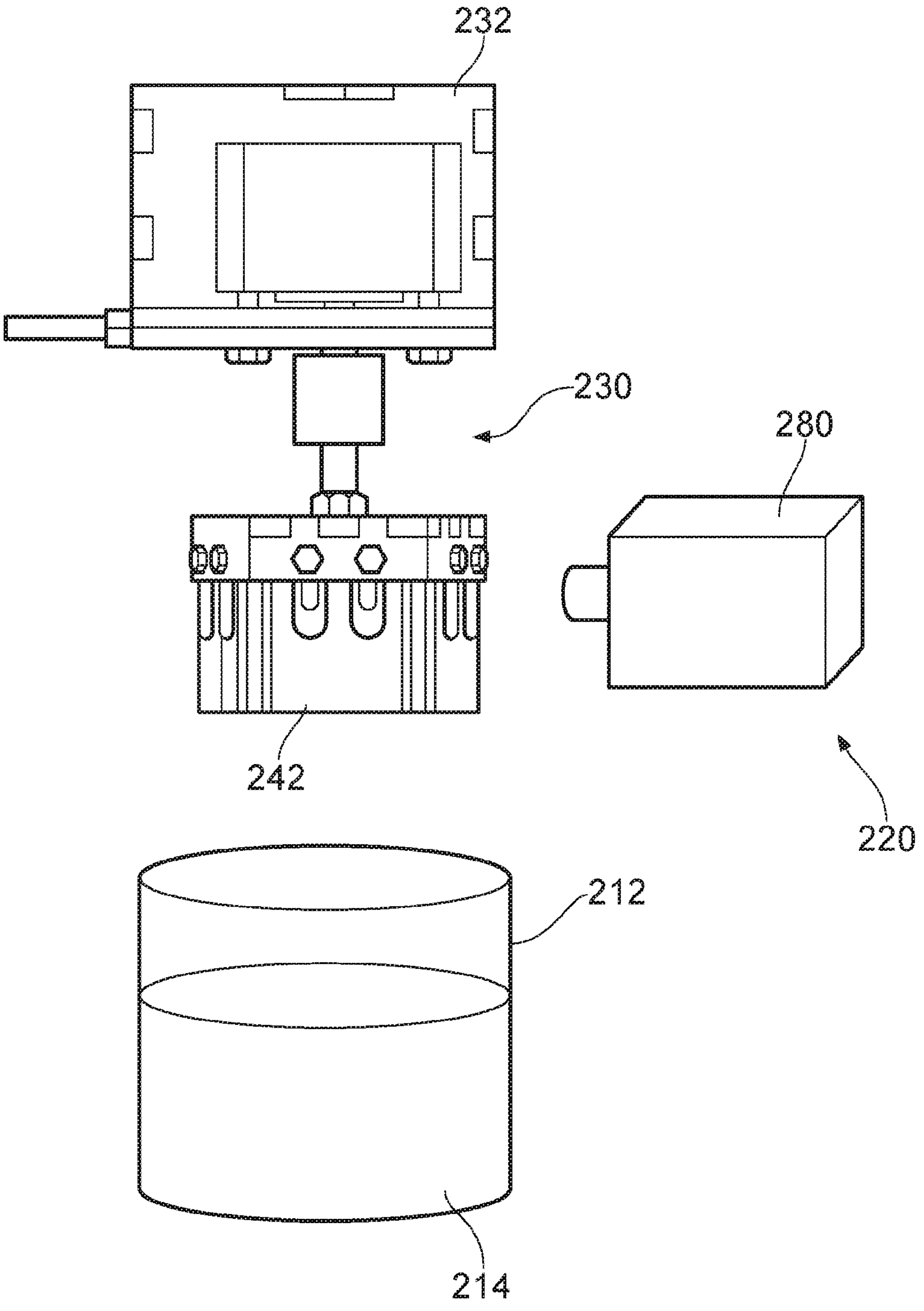
FIG. 1*b* illustrates various components of the apparatus of FIG. 1*a;*

FIG. 1*a* shows an example of an apparatus 200 for performing a LbL deposition technique. FIG. 1*b* shows a simplified example configuration of the various components of the apparatus 200.

The apparatus 200 includes a substrate holder 230. The substrate holder 230 is configured to hold or retain at least one substrate 242. In this example, the substrate holder 230 includes a retaining portion or mechanism 244 for gripping or retaining the substrate 242. The substrate holder 230 is described in further detail below with reference to FIGS. 2*a*, 2*b* and 2*c*.

The substrate 242 may be formed of any appropriate material, for example metallic, ceramic, polymeric, composites, flat, dense, or porous, materials, or any appropriate combination thereof. Examples of appropriate materials include synthetic and natural-based polymers such as polylactic acid, polycaprolactone, polycarbonate, collagen, gelatine, or any appropriate combination thereof. The substrate 242 may be pre-charged or have an intrinsic charge.

The apparatus 200 includes a dip assembly 210 and a spray assembly 220. The dip assembly includes a reservoir 212. The reservoir 212 contains a charged solution 214. The charged solution 214 is of sufficient volume such that a substrate 242 can be at least partially immersed therein, in this case the volume is 150 millilitres. The reservoir 212 may be any suitable receptacle, capable of containing a charged solution 214. In this example the reservoir 212 is a beaker.

In this example, the spray assembly 220 includes an atomizing nozzle 280. The atomizing nozzle 280 is suitable for spraying the substrate 242 with an atomized charged solution. In this example, the atomizing nozzle 280 is fluidically connected to the charged reservoir 212. More specifically, the atomizing nozzle 280 is connected to the reservoir 212 via air flow tubes. The air flow tubes include a compressor for atomizing a portion of the charged solution. The portion of the charged solution 214 is atomized prior to spraying the substrate.

The apparatus 200 is capable of moving the substrate holder 230 between a spraying position and an immersed position. In the spraying position the substrate holder 230 holds the substrate 242 such that the substrate 242 is substantially adjacent to the atomizing nozzle 280. This allows the substrate to be sprayed with the atomized charged solution. In this example the distance between the spray nozzle 280 and the substrate is from about 20 millimetres to about 100 millimetres. Aptly, the distance is about 50 millimetres. In the immersed position the substrate holder 230 holds the substrate 242 such that the substrate 242 is at least partially immersed in the charged solution 214 contained within the reservoir 212. In this example, in the immersed position, the substrate holder 230 is disposed such that the substrate 242 is fully immersed or covered by the charged solution 214.

In this example, the substrate is both immersed and sprayed with the same charged solution. In this example, the spraying position is above and in line with the immersed position for the charged solution 214. That is, in the spraying position the substrate housing 230 is directly above the reservoir 212. By having the spaying position above and in line with the immersed position, waste charged solution 214 from the spray assembly 220 may be collected by the dip assembly 210 in the reservoir 212.

In this example, the apparatus 200 includes an arm 236 configured to move the substrate holder between the spraying position and the immersed position. The arm 236 is attached to the substrate holder 230. The arm incudes a motor enclosure 232 to which the substrate holder 280 is attached. The arm 236 may be configured to move the substrate holder 230 between the spraying position and the immersed position in any suitable manner. For example, the arm 236 may have a track portion 238 and a carriage portion 234. In such an example, the carriage portion 234 is movable along the track portion in a first and second direction. The carriage portion 234 is configured to be attached to the motor enclosure 232, which is in turn attached to the substrate holder 230.

The above described configuration allows an immersion step and spraying step to be carried out on the substrate, both steps using the same charged solution. That is, the substrate is at least partially immersed in a charged solution and sprayed with the same charged solution. In other examples, the substrate may be immersed and sprayed with different charged solutions.

In some examples, the apparatus may include at least one further dip assembly and/or at least one further spray assembly to allow the immersion step(s) and spraying step(s) to be carried out using different charged solutions.

In the described example the apparatus 200 includes at least one further dip assembly and at least one further spray assembly. The further dip and spray assemblies may be substantially the same as those described previously, however the charged solution may differ between different spray and dip assemblies. For example the charged solution, used in the first spray assembly and first dip assembly, may be a positively charged solution and the further charged solution, used in the further dip assembly and/or the further spray assembly may be a negatively charged solution.

In the described example the apparatus 200 also includes a yet further dip and spray assembly, where a rising solution is contained within a reservoir 212. As such, a rising step to remove any excess solution can be performed.

In this example, the apparatus 200 includes a housing 270. The housing 270 encloses the dip assembly 210 and the spray assembly 220. Each of the further dip and spay assemblies are contained in an enclosure portion 720 of the housing 270. This helps to prevent cross contamination between charged solutions 214. The housing 270 is described in more detail below in relation to FIG. 7.

Figure 2A:
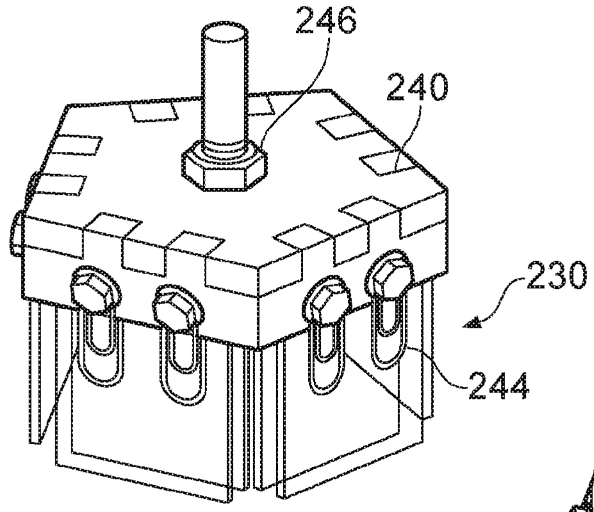
FIG. 2*a* illustrates an example substrate holder of the apparatus of FIG. 1*a;*
Figure 2B:
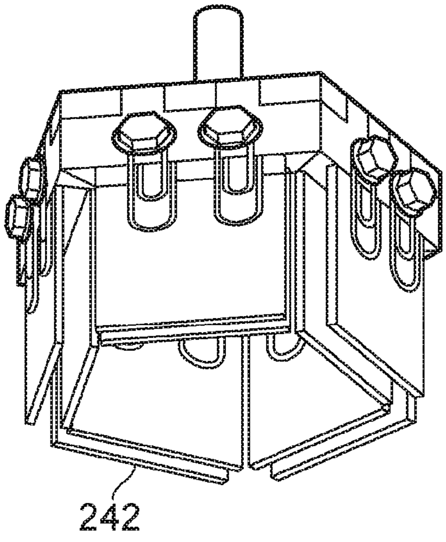
FIG. 2*b* illustrates another view of the substrate holder of FIG. 1*a;*
Figure 2C:
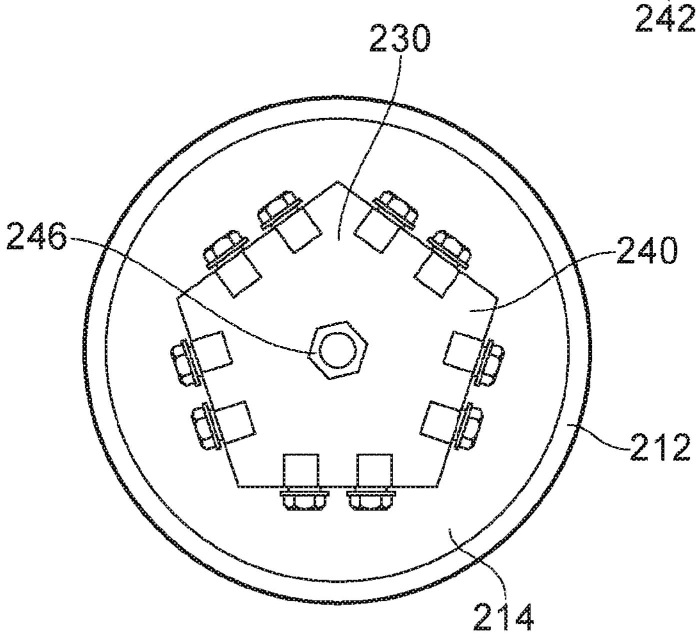
FIG. 2*c* illustrates a plan view of the substrate holder of FIGS. 2*a* and 2*b;*

FIGS. 2*a*, 2*b* and 2*c* show the substrate holder 230 in various perspectives. In this example, the substrate holder 230 includes a top portion 240.

In this example, the top portion 240 is pentagon shaped when viewed in a plan view. The pentagon shape of the top portion 240 allows for 10 substrates 242 to be held simultaneously by the substrate holder 230. That is, an inner and outer substrate 242 can be held by a retaining mechanism 244 on each edge of the top portion 240. It would be understood that a different shaped top portion 240 may be used depending on the number of number of substrates that the substrate holder is required to hold.

In this example, each edge of the top portion 240 is from 30 millimetres to 60 millimetres in length. The substrate 242 may be from 20 millimetres to 50 millimetres width by 20 millimetres to 50 millimetres length. As such, when holding the substrates 242, the substrate holder 230 may fit inside a 200 millimetre volume beaker.

The retaining mechanism 244 grips the substrate 242 in a releasable manner, such that once LbL deposition is complete, the substrate 242 may be removed. For example, the retaining mechanism 244 may be formed of paper clips, or spring clips, or any other appropriate mechanism capable of holding a substrate. In this example, the substrate holder 230 includes a plurality of retaining mechanisms 244, to allow the retention of multiple substrates 242.

In this example, the top portion 240 of the substrate holder 230 includes an attachment element 246. The attachment element 246 attaches the substrate holder 230 to the motor enclosure 232 of the arm 236. In this example, the attachment element 246 is a longitudinal shaft with a threaded end portion suitable for fixing with nuts and washers. The substrate holder 230 is therefore removable from the motor enclosure 232 of the arm 236.

Figure 3:
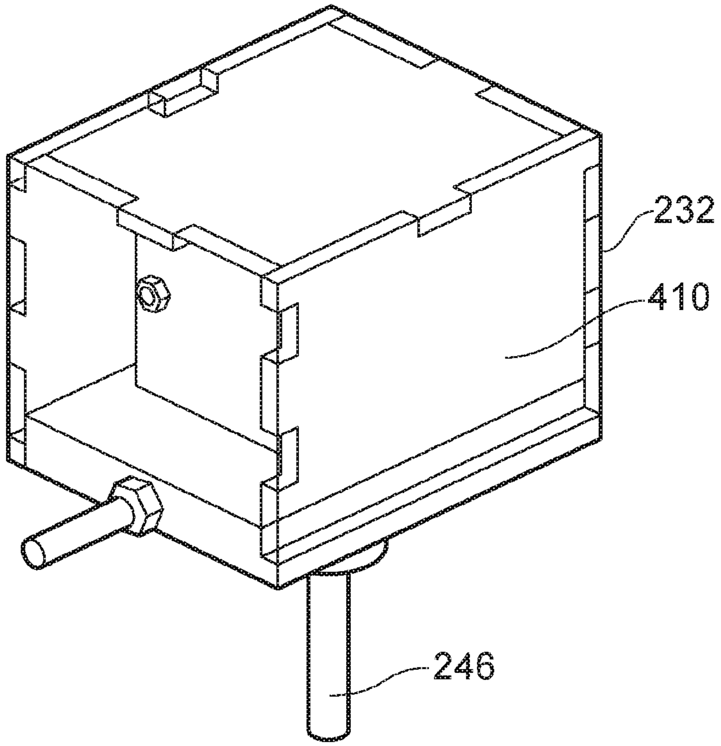
FIG. 3 illustrates an example of a motor enclosure.

FIG. 3 shows the motor enclosure 232. The motor enclosure 232 houses a motor 410, for example a 12 volt stepper motor. The motor 410 is configured to rotate the substrate holder 230. That is, the motor 410 is configured to rotate the substrate holder 230 relative to the atomizing nozzle. This allows precise control of the orientation of the substrates 242 held by the substrate holder 230, allowing the plane of the substrate 242 to be accurately positioned in front of the atomizing nozzle 280.

The motor 410 may be configured to rotate the substrate holder 230 at any suitable rate. For example, the motor 410 may rotate the substrate holder at a rate of 150 milliseconds per step. During the spraying of the substrate 242 the substrate may be rotated within the atomized spray of charged solution, thereby ensuring a good coverage of charged solution on the substrate 242.

The motor enclosure 232 surrounds and seals the motor 410 to protect the motor 410 from any stray charged solution 214 arising during the spraying of the substrate 242. The motor enclosure 232 includes an opening located at the back of the motor enclosure 232 to allow the necessary wiring to exit and be integrated into the overall electrical system (not shown).

Figure 4:
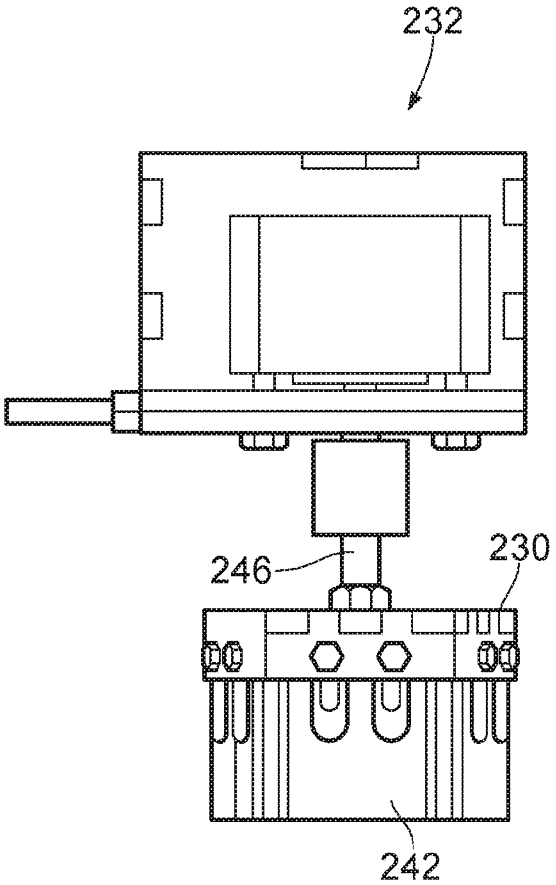
FIG. 4 illustrates the motor enclosure of FIG. 3 and the substrate holder of FIG. 1*a;*
Figure 5:
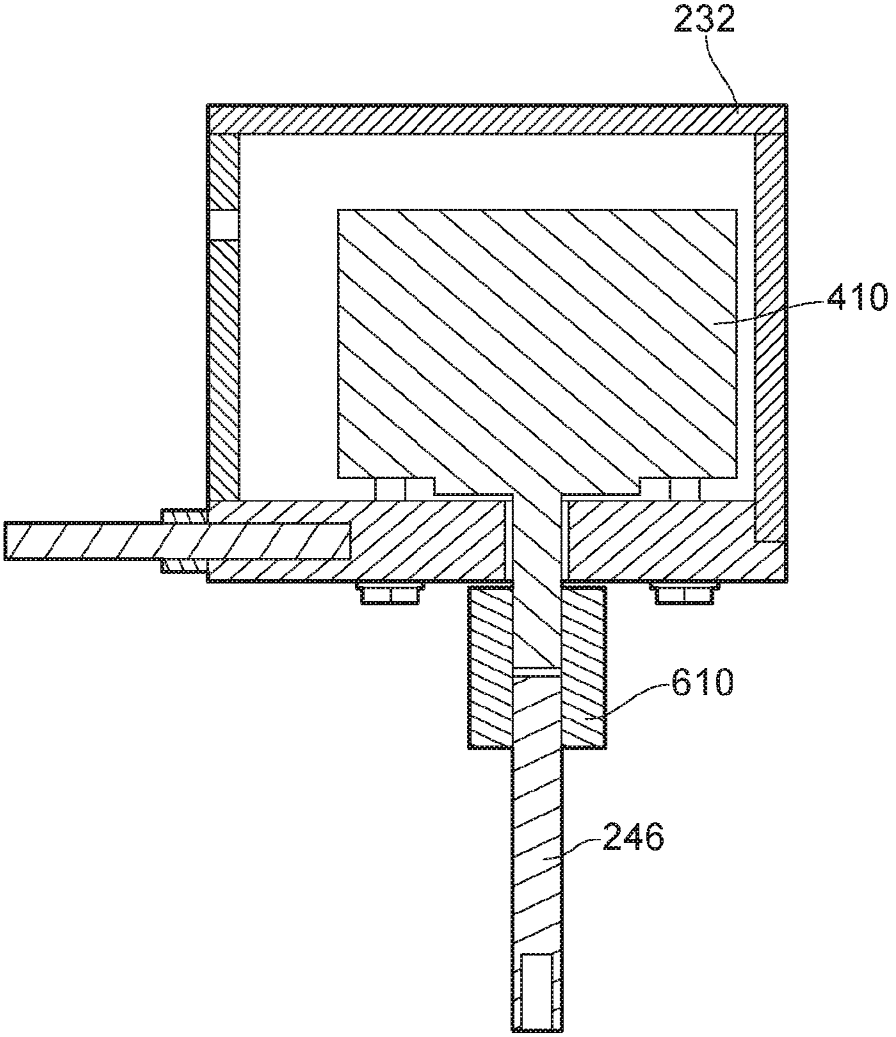
FIG. 5 illustrates a cross-sectional view of the motor enclosure of FIG. 4.

FIG. 4 shows the motor enclosure 232 of FIG. 3 attached to the substrate holder 230 and FIG. 5 shows a cross sectional view of the attachment arrangement of the motor enclosure 232 and the attachment element 246.

In this example, the attachment element 246 is surrounded by a flexible metallic coupling 610 fixed securely with bolts, for example M3 bolts.

Figure 6A:
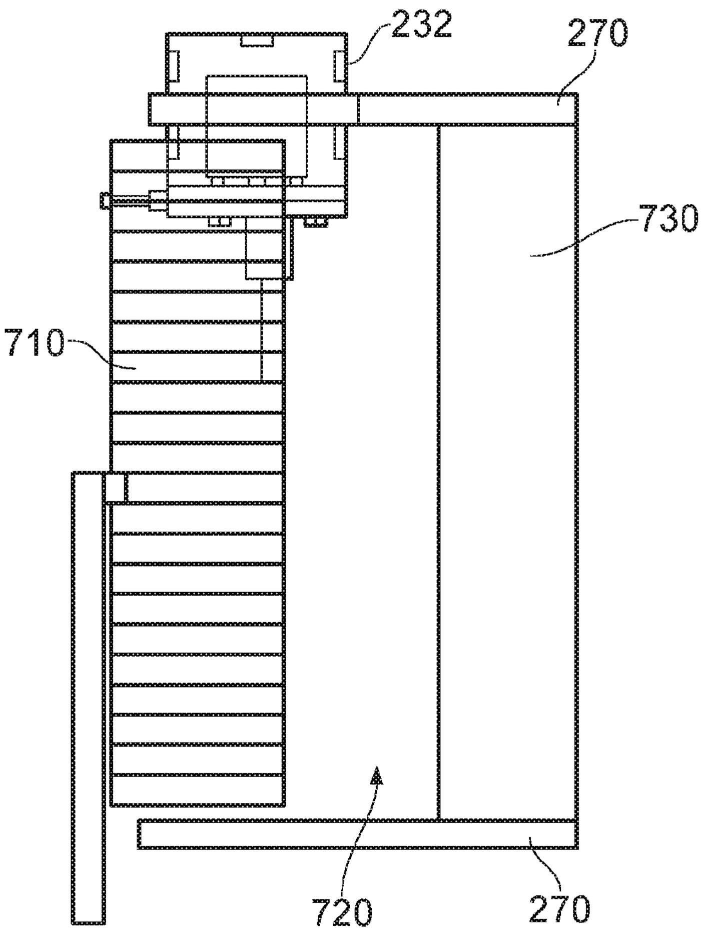
FIG. 6*a* illustrates an example of an enclosure portion of the apparatus for thin-film fabrication.
Figure 6B:
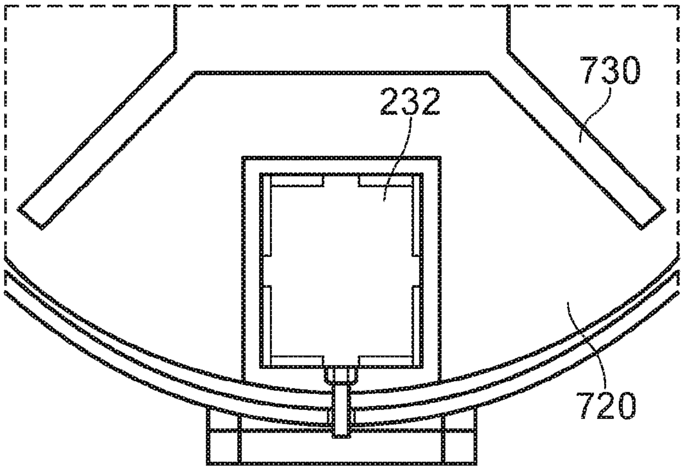
FIG. 6*b* illustrates a plan view of FIG. 6*a;*

FIGS. 6*a* and 6*b* illustrate the enclosure portion 720 of the apparatus 200. The enclosure portion 720 is formed by the housing 270, a spray shield 710 and the motor enclosure 232. The housing 270, spray shield 710 and motor enclosure 232 fit together such that the enclosure portion 720 is substantially sealed. That is, the housing 270, spray shield 710 and the motor enclosure 236 are of complementary shape so as to sit flush against one another when the substrate holder 230 is in the spraying position. Therefore, during the spray of the substrate 242 no charged solution is released into the surrounding environment.

Figure 7:
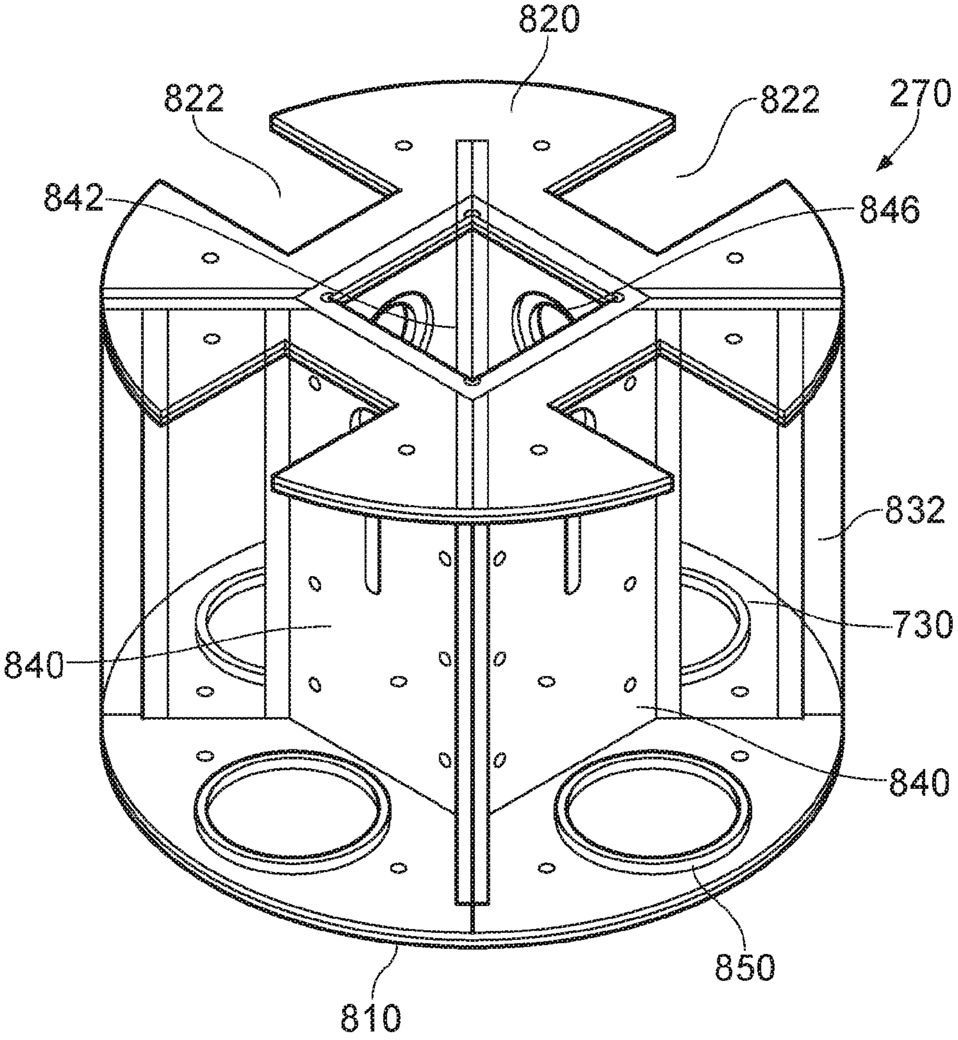
FIG. 7 illustrates an example housing portion of the apparatus for thin-film fabrication.

FIG. 7 illustrates the housing 270. The housing 270 is formed of a bottom plate 810 and a top plate 820 opposite the bottom plate 810. The top plate 820 and bottom plate 810 are spaced apart by internal walls 730 and a central enclosure 840.

The housing 270 may be made from an acrylic material for example Perspex®. The housing components may be shaped from the acrylic material using laser cutting. The top plate 820 and bottom plate 810 are each formed of a 3 millimetre thick acrylic plate. The top and bottom plates 810, 820, internal walls 830 and central enclosure 840 may be formed integrally or be formed separately and then joined together by any appropriate means, for example the pieces may slot together.

The bottom plate 810 includes a retaining ring 850. The retaining ring 850 protrudes from the bottom plate 810 toward the top plate 820. The retaining ring 850 is configured to retain the reservoir 212 of charged solution. By including the retaining ring 850 unintentional movement of the reservoir 212 is reduced.

As shown in FIG. 7 the top plate has cut out portions 822. The cut out portions 822 are shaped to correspond to the motor housing 232. Thus, when in the spray position, the motor housing and top plate 820 engage one another to prevent charged solution escaping. Optionally sealing means such as rubber seals may be included on the edges of the cut out portions 822.

The top plate 820 may also include a central aperture 842. The central aperture 842 sits above the central enclosure 840. The central enclosure 840 is formed of four walls. Each wall may be a 3 millimetre depth by 50 millimetre width and 200 millimetre length acrylic sheet. The walls of the central enclosure 840 each include a mounting hole 846 for an atomizing nozzle. The central enclosure 840 may also include holes for intake piping of the atomizing nozzle (not shown).

The internal walls 730 split the housing 270 into multiple enclosure portions 720. For example, the apparatus 200 includes at least one further atomizing nozzle and/or at least one further reservoir contained by a separate enclosure portion to the atomizing nozzle and reservoir. The internal walls 730 are configured to prevent cross contamination of the charged solutions. The internal walls 730 act as a shield between the atomizing nozzle 280 and reservoir 212 of the charged solution and the further atomizing nozzle and further reservoir of a further charged solution.

In this example, the internal walls 730 split the housing 270 into four enclosure portions 720. Each enclosure portion 720 has a charged solution 214 in a reservoir 212 or a rinsing solution in a reservoir. Each enclosure portion 720 has an associated atomizing nozzle 280 fluidically connected to the corresponding reservoir 212. Each enclosure portion 720 may have a different charged solution or rinsing solution.

To move the substrate holder 230 between different enclosure portions 720 the housing 270 rotates with respect to the arm 236. For example, the carriage portion 234 moves to the top of the track 238 such that the substrate 242 is no longer contained in an enclosure portion 720 of the housing 270. The housing 270 rotates such that a different enclosure portion 720 is adjacent the arm 236. The housing 270 may then rotate such that a different enclosure portion 720 is below the substrate 242. The substrate 242 can then be lowered into the different enclosure portion 720.

The rotation is achieved by attaching the bottom plate 810 to a rotating system (not shown). The housing may rotate 180 degrees for example.

Additional sealing means 832 can be attached to the periphery of the internal walls 730. The additional sealing means 832 sealingly engages with the spray shield 710 to prevent charged solution from escaping the enclosure portion 720.

Figure 8A:
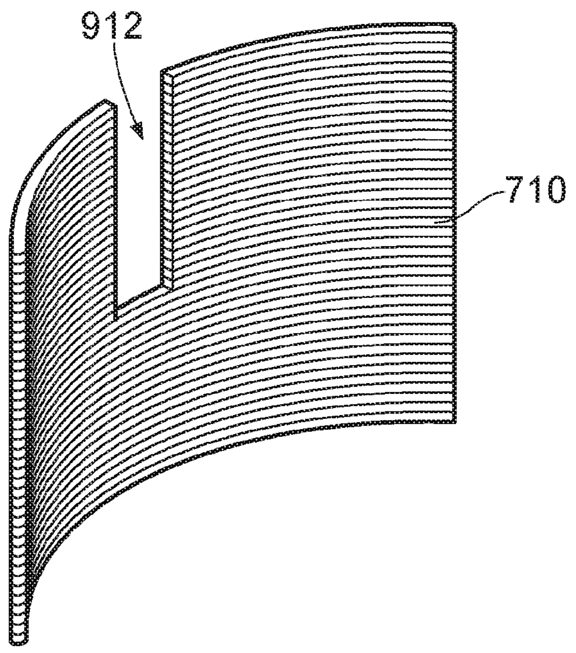
FIG. 8*a* illustrates a shield for the apparatus for thin-film fabrication.
Figure 8B:
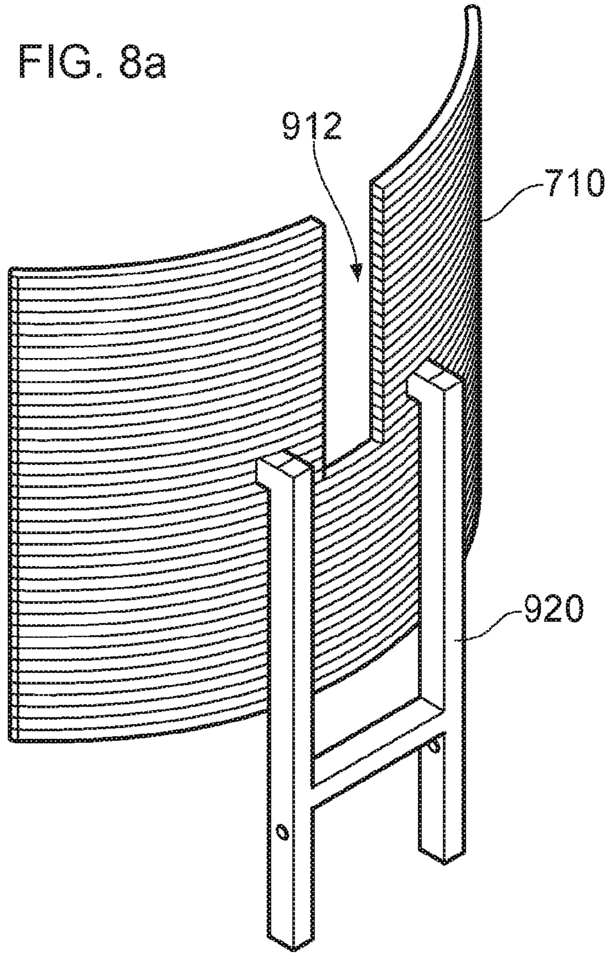
FIG. 8*b* illustrates the shield of FIG. 8*a* including a stand.

FIG. 8*a* and FIG. 8*b* show the spray shield. FIG. 8*b* also illustrates a stand 920 for fixing the spray shield 710. The spray shield 710 may be constructed using stacks of acrylic strips to form a curved structure as shown in FIGS. 8*a* and 8*b*.

The spray shield 710 includes an opening 912. The opening 912 allows for the passage of the arm 236 as the carriage portion 234 moves along the track portion 238 moving the substrate holder 230 in a first and second direction. The edges of the opening 912 may have a sealing means to create a seal between the arm 236 and the spray shield whilst allowing movement of the arm.

The apparatus 200 may further include a control system (not shown) for controlling the rotation of the substrate holder 230; the rotation of the housing 270 and the movement of the substrate holder 230 between the spraying position and the immersed position. The control system controls the duration the substrate 242 is sprayed for, the length of immersion of the substrate 242 in the charged solution and or the length of the rinsing step. The control system allows the user to predetermine the number of layers for the deposition on the substrate 242. In this example, the control system is pre-set for a total of 100 layers. That is, 50 layers by spray deposition and 50 layers by dipping deposition. The control system may further allow the user to predetermine the charged solution in depositing each layer.

The control system allows the number of repetitions of the method to be controlled, and as such the number of layers for the thin film may be predetermined. In this example there is 30 repetitions.

Figure 9:
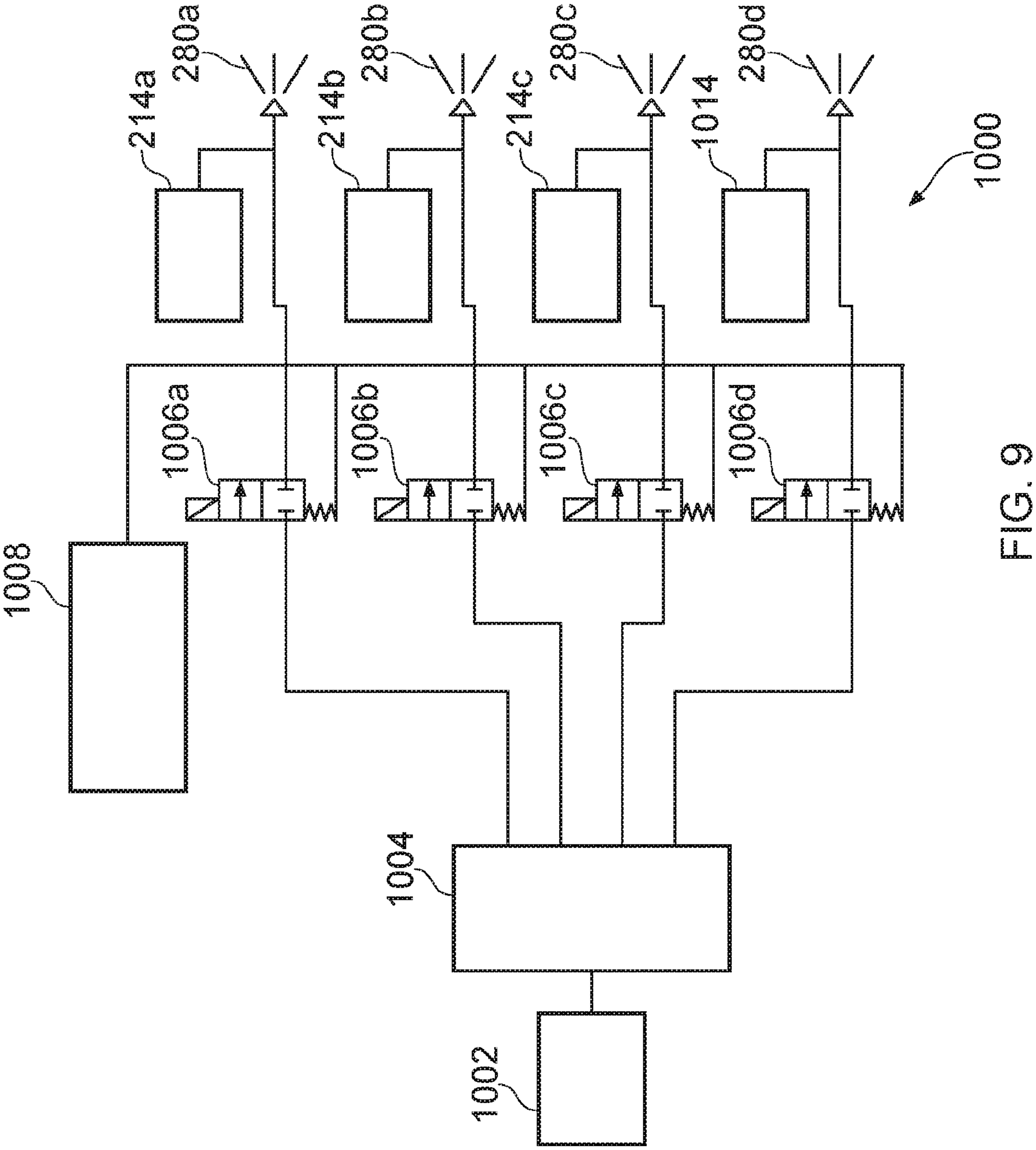
FIG. 9 illustrates a schematic of an example spray assembly.
Figure 10:
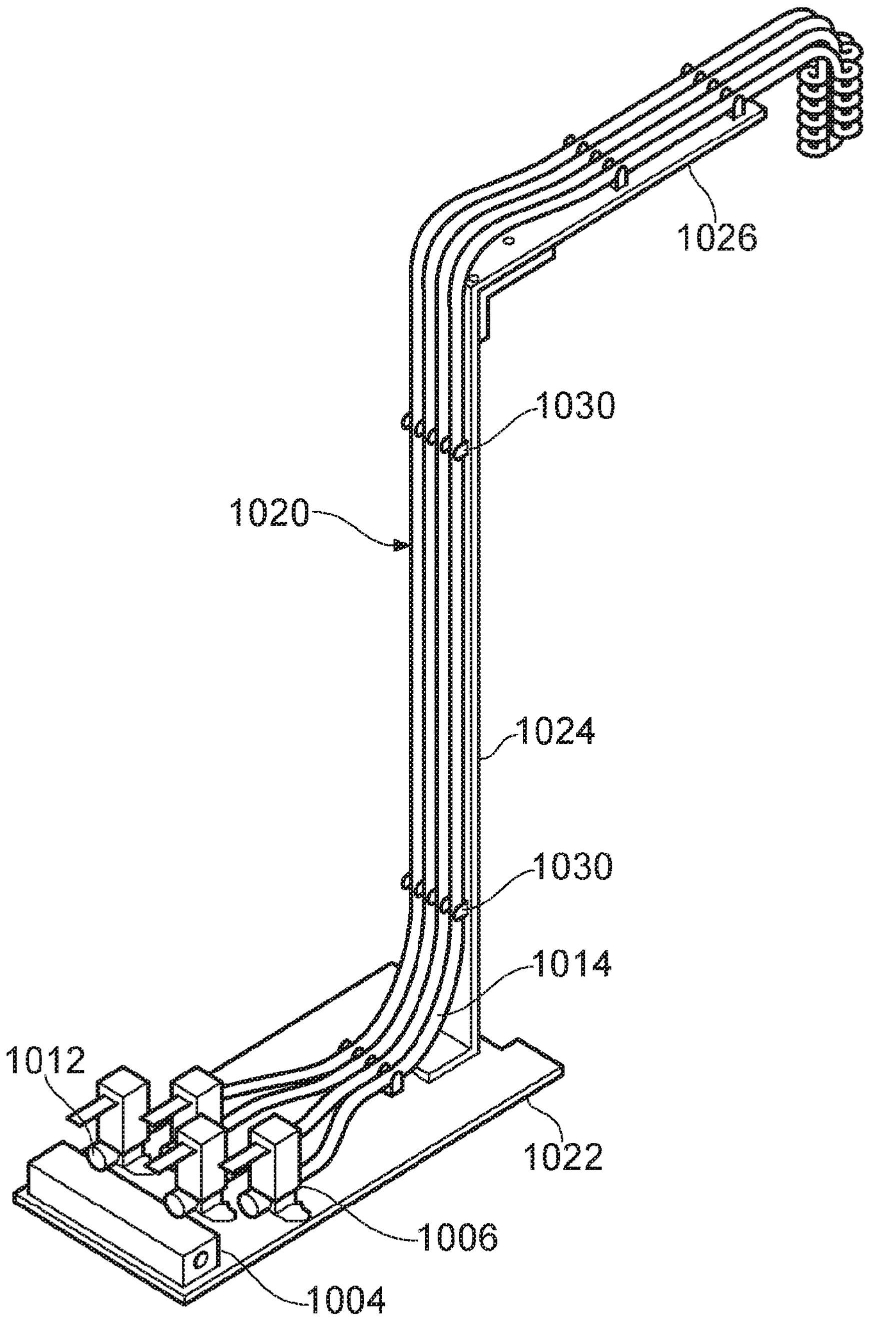
FIG. 10 illustrates the example spray assembly of FIG. 9 (without spray nozzles)

FIG. 9 illustrates a schematic diagram of an example spray assembly 1000 with 3 charged solutions 214*a-c* and a rinsing solution 1014 and FIG. 10 illustrates the air compressor arrangement of the spray assembly 220. The system includes a compressor 1002. The compressor builds up the air pressure needed to suck the charged solutions 214*a-c*, or rinsing solution 1014 through to the corresponding atomizing nozzle 280*a-d.*

The compressor is fluidly coupled to a manifold 1004 via air flow tubing 1012. The manifold splits the air flow tubing into four to form four flow pathways 1014. These four flow pathways 1014 are each connected to a 2/2 normally closed solenoid valve 1006*a-d*. These valves 1006*a-d* have two openings and two distinct states, open and closed. The valves 1006*a-d* are normally closed, and require an electric current to open.

To control the opening of the valves 1006*a-d* a controller 1008 is electrically connected to each valve 1006*a-d*. The controller 1008 controls the valves 1006*a-d* to open individually. Thus, the controller controls which valve 1006*a-d* sprays liquid from the desired atomizing nozzle 280*a-d*. The controller 1008 can control air intake to allow variability in spray factors. The controller 1008 may be integrated with the control system described above.

As shown in FIG. 10 the air flow system is supported by a housing 1020. The housing 1020 is formed of a base portion 1022, a centre portion 1024 and a top portion 1026. In this example the housing 1020 is substantially R-shaped. That is, the base portion 1022 and the top portion 1026 are spaced apart and parallel to one another. The base portion 1022 and top portion 1026 are spaced apart by the centre portion 1024, the centre portion 1024 being substantially perpendicular to the top portion 1026 and base portion 1024.

The R-shaped housing 1020 provides the pressurized air to the four nozzles 280*a-d* without interfering with any of the apparatus 200 other systems such as the arm 236. That is the housing 1020 loops over the top of the apparatus and does not interfere with any of the moving components.

In this example the air flow tubing 1012 and flow pathways 1014 are formed of nylon pipes and are relatively stiff. The solenoid valves 1006 are lined up with the exit holes of the manifold 1004 to stop the pipes bending. From the solenoid valves 1006 the flow pathways 1014 are grouped together by passing through a series of pipe clips 1030 that take the flow pathways 1014 from the base to the end of the housing 1020.

An example of a method of layer-by-layer deposition for thin-film fabrication will be described below. The method includes an immersion step (or dip step) and a spray step. The method may also include an optional rinse step after the spray step and/or after the immersion step. To carry out the method, an apparatus, such as apparatus 200 described above, or variants thereof, may be provided. That is, a spray assembly 220 is provided for spraying an atomized charged solution and a charged solution 214 is provided within the reservoir 212.

During the immersion step the substrate (or substrates) is at least partially immersed in the reservoir 212 of charged solution to deposit a layer on the substrate (or on each substrate). In this example, the process of immersing the substrate is undertaken by the substrate holder, which dips the substrate such that is at least partially immersed in the charged solution (i.e. the substrate is moved to an immersed position).

The immersion step may be undertaken for a time period to ensure equilibrium adsorption is reached. That is, the substrate may be maintained in the immersed position for a time period. The time period may be from about 5 to about 15 minutes, in this case about 10 minutes. The time period begins once the substrate 242 is immersed in the charged solution 214.

The speed of immersion during the immersion step can be from 100 millimetres per minute to 400 millimetres per minute. In this example the speed of immersion is approximately 150 millimetres per minute. Aptly this speed is the fastest speed which does not damage the film quality.

In this example, the spray step is undertaken after the immersion step. During the spray step, the substrate (positioned in the spraying position) is sprayed with an atomized charged solution to deposit a layer on the substrate. In this example, with the spray step undertaken after the immersion step, the spray step deposits a further layer on the substrate, or more specifically on the previously deposited layer.

In some examples, the charged solution used in the immersion step and the spray step may be the same charged solution. In such examples, both the immersion step and the spray step may be undertaken with the substrate (or substrates) located in the same enclosure portion 720 of the apparatus 200.

In some examples, the charged solution used in the immersion step and the spray step may be different. In such examples the substrate may be moved to a further enclosure portion 720 prior to the spray step to avoid contamination between the different charged solutions.

The spraying step may be undertaken for a time period to ensure the coverage of the deposited layer is homogeneous on the substrate. The time period of the spray step may be from about 2 to about 20 seconds, in this case about 5 seconds. It would be understood that the time period may be selected based on the charged solution composition and or the composition of the substrate.

During the spray step the substrate may be rotated by the substrate holder. In this way the substrate may be sprayed homogenously from a plurality of angles.

The method may include further immersion steps and/or further spray steps to build up additional layers on the substrate. The additional immersion steps may include immersing the substrate 242 in the same reservoir of charged solution as previous immersion steps and/or immersing the substrate 242 in further reservoirs of charged solution. The additional spraying steps may include spraying the substrate 242 with the same charged solution as previous spraying steps and/or spraying the substrate 242 with a further charged solution.

As the immersion steps and spray steps are completed layers are built on top of one another. In this example a thin film is formed of approximately 100 layers, although required number of layers may be achieved with this method depending on the desired use of the thin film. Adjacent layers formed on the substrate may be of opposite or the same charge, although generally at least one positively charged solution and at least one negatively charged solution are used to build up a stable thin film.

In some examples, the method includes a spray step where the charged solution includes a biological material, for example a biomolecule solution. Thus, a biomolecule layer can be added to the thin film. For example, the final spray step can include a charged solution including a biological material. In this way the biological material is embedded in at least the top layer of the thin film. As the biological materials are relatively expensive it is preferable to apply the biological materials with a spray step to reduce waste. An immersion step for applying biological materials is also envisaged for thin films where homogeneity of the biological material layer is paramount.

The method of thin film deposition may also include a further step of rinsing the substrate. The rinsing step may occur after the spray step (or any of the spray steps) and/or after the immersion step (or any of the immersion steps). The rinsing step removes excess charged solution from the substrate. That is, any charged solution which has not formed part of a layer during the previous step. The rinsing step may include immersing the substrate in a reservoir of rinsing solution after lifting the substrate from the reservoir of charged solution. Alternatively (or in addition) the rinsing step may include spraying the rinsing solution at the substrate, as used herein this is referred to as a spray rinsing step.

For the rinsing step the substrate 242 may be moved into a yet further enclosure portion (than those used for the spray or immersion steps). In the yet further enclosure portion the set up of the nozzle and reservoir may be the same as described above, but instead of a charged solution contained in the reservoir it is a rinsing solution. In this example, the rinsing solution is water.

In some examples multiple rinsing solutions may be contained in even further enclosure portions than those used for the spray or immersion steps or the rinsing step above. Thereby, each charged solution may have a corresponding rinsing solution so as to avoid cross-contamination.

EXAMPLES

In the general examples described above, a method is described with at least one dip step and at least one spray step. The method may be implemented with many different combinations of the dip and spray steps for building a thin film using layer by layer deposition. That is, dip and spray steps may be used in various combinations and/or with various charged solutions used for each step. Non-limiting examples are given below outlining possible step permutations and possible charged solutions used in each step.

The charged solutions are a liquid with either a positive or negative charge. In the examples described below the charged solutions are polyelectrolyte solutions and biomolecule solutions. The biomolecules described below may be growth factors, antibodies, cells or carbon quantum dots for example.

Example 1

First the substrate is dipped in a positively charged Chitosan solution. Any excess solution is then removed in a rinsing step. Next the substrate is sprayed with a negatively charged biomolecule solution. A further rinsing step then takes place. The above process is repeated until a thin film is built up.

Example 2

The substrate is first dipped in a positively charged Chitosan solution. Any excess solution is then removed in a rinsing step. A positively charged first biomolecule solution is then sprayed onto the substrate. Any excess solution is then removed in a rinsing step. The substrate is then dipped in a negatively charged Chondroitin sulphate solution. Finally, a second negatively charged biomolecule solution is sprayed onto the substrate. A further rinsing step then takes place. The above process is repeated until a thin film is built up.

Example 3

First the substrate is dipped in a positively charged Chitosan solution. Any excess solution is then removed in a rinsing step. Next the substrate is dipped in a negatively charged Chondroitin sulphate solution. The substrate then undergoes a further rinsing step. This is then repeated for 30 cycles for a flat substrate or 15 cycles for a porous substrate. The substrate is then sprayed with the positively charged chitosan solution. Then after a further rinsing step, the substrate is sprayed with negatively charged biomolecules and rinsed again.

This example will create a thin film with a gradient in which the biomolecules are contained in the top layers of the coating.

Example 4

First the substrate is dipped in a positively charged Chitosan solution. Any excess solution is then removed with a rinsing step. Next, the substrate is sprayed with a negatively charged biomolecule solution. A further rinsing step is then performed to remove any excess biomolecule solution. The above process is repeated until a thin film is built up.

Example 5

The stability of the coating after the combination of the dipping and spray was tested. Particularly, dipping was used for the first 10 layers and then the spray for the remaining 6. The substrate was a dense film composed of polycaprolactone, that was aminolysed in order to create positive charge on the surface. The coating used was standard polyelectrolytes PSS (negative charged) and PAH (positive charged).

The immersion steps help to create a thicker coating on the surface of the substrate, while the spray step has improved speed in adding a layer. The molecules may also be released in a controlled manner using the spray step. The spray allows also to reduce the related costs with the incorporation of these molecules, because less solution is required for the spray, and any excess solution can be recaptured and utilised for the immersion steps.

It was previously anticipated that the incorporation of a spraying step would reduce the stability of the coating. However, the inventors have surprisingly found that the combination of an immersion step and a spray step allows for the advantages of both methods to be exploited while maintaining the stability of the layers as evidenced in the table below showing the values of static contact angles.

TABLE 1

Values of static contact angles for dipping and combined dipping/spray coating.

| Layer number of the substrate | Mean Contact angle (°) Immersion | Immersion and spray combination (10 Layers of immersion and 6 layers of spray) |
|---|---|---|
| 2 | 70 ± 3 | 72 ± 4 |
| 3 | 58 ± 2 | 60 ± 3 |
| 6 | 83 ± 4 | 78 ± 3 |
| 7 | 68 ± 3 | 70 ± 4 |
| 10 | 80 ± 4 | 85 ± 5 |
| 11 | 62 ± 2 | 70 ± 2 |
| 15 | 50 ± 6 | 57 ± 4 |
| 16 | 82 ± 5 | 84 ± 6 |

The incorporation of the spraying step for layer-by-layer deposition did not influence the stability of the coating because similar values and typical alternative trend in the values (that is characteristic of Layer-by-Layer) has been maintained.

Figure 11A:
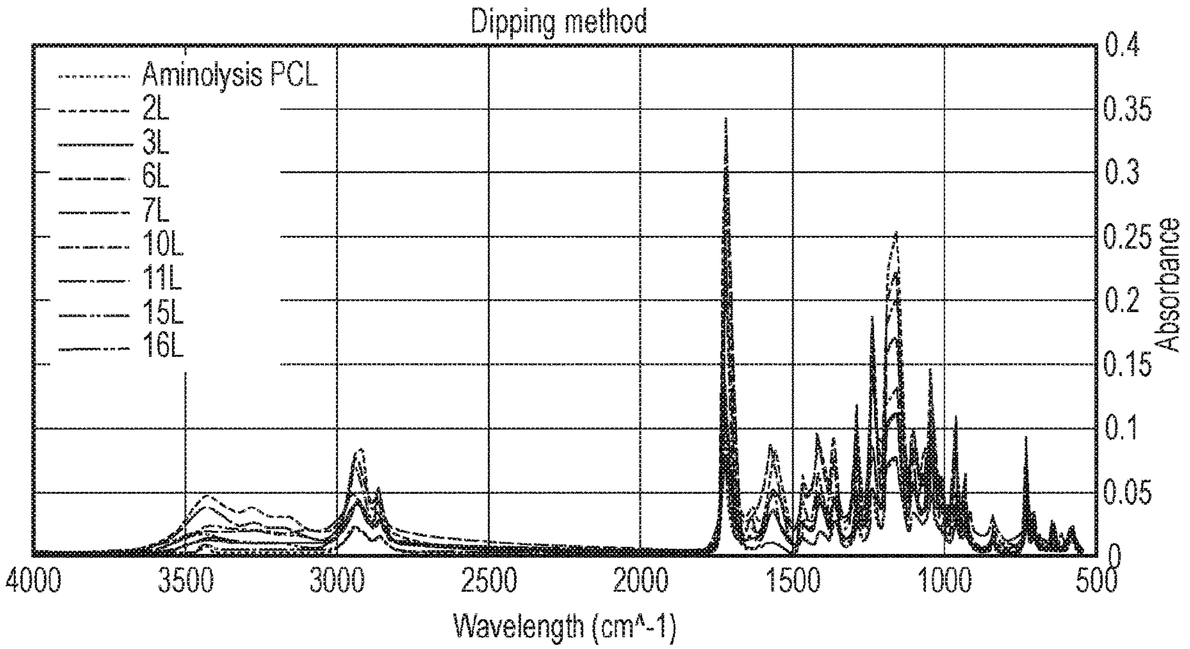
FIG. 11*a* illustrates FTIR-ATR spectra of LbL coatings formed via dipping steps only.
Figure 11B:
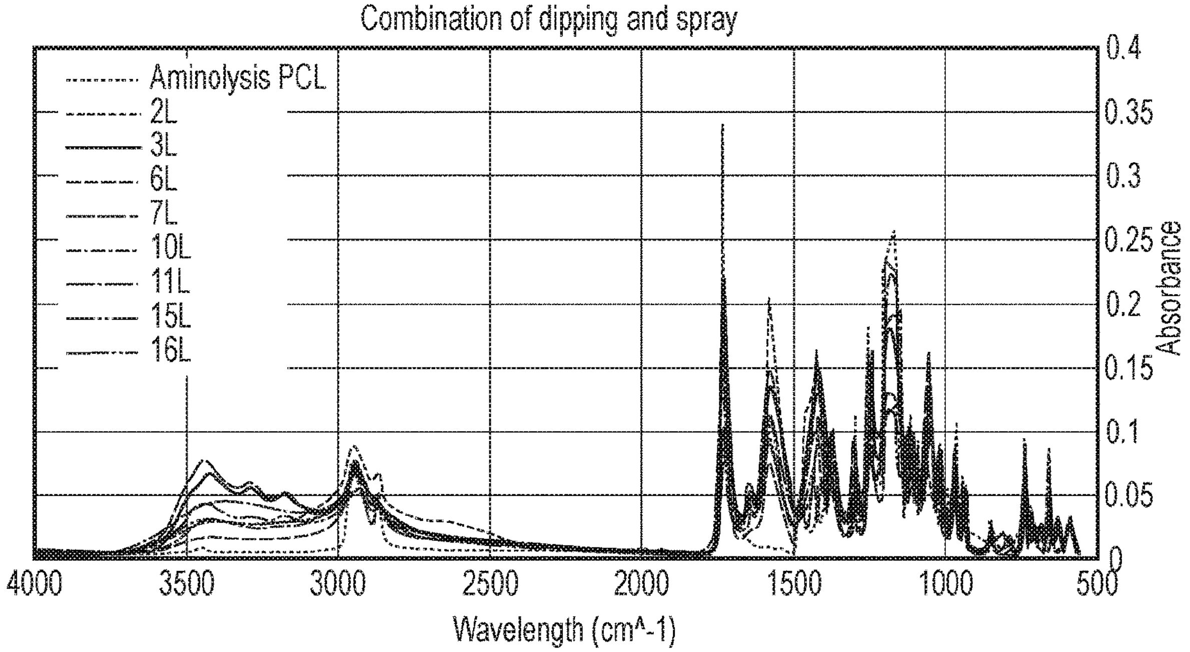
FIG. 11*b* illustrates FTIR-ATR spectra of LbL coatings formed via a combination of dipping steps and spray steps.

This is further shown in FIGS. 11*a*. and 11*b*. FIG. 11*a* is FTIR-ATR (Fourier-transform infrared—attenuated total reflection) spectra of the LbL coating composed of 16 layers with just the immersion steps and FIG. 11*b* is a FTIR-ATR spectra of the LbL coating composed of 10 layers of immersion and 6 layers of spray. As shown very similar (or identical) spectra was obtained for both methodologies used. The difference in the absorbance values are due to the fact that FTIR-ATR is a qualitative analysis but the peaks are revealing the same chemical structures of the coatings obtained with both methodologies.

Figure 12A:
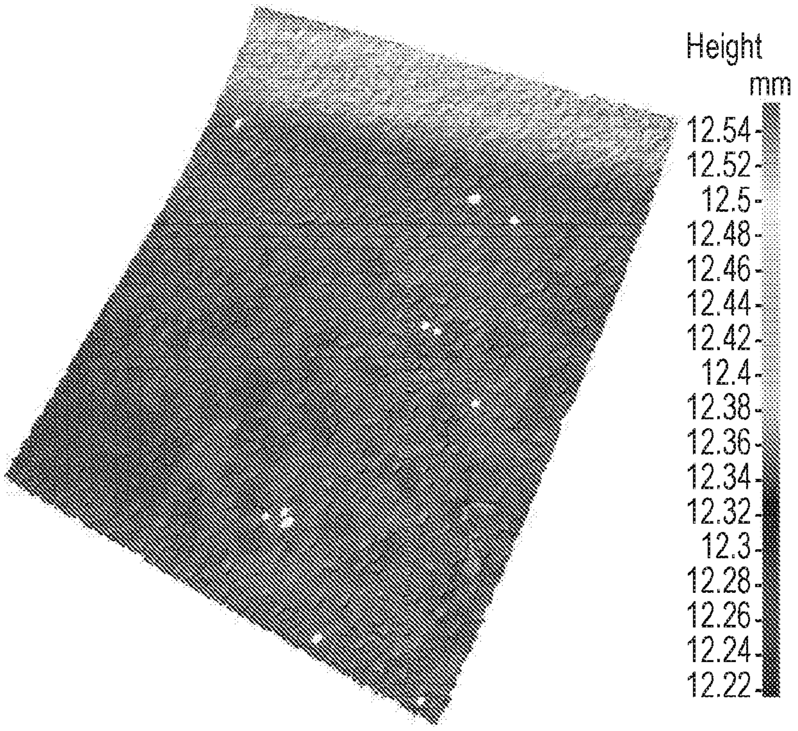
FIG. 12*a* illustrates a profilometry analysis of LbL coating (16 layers) of FIG. 11*a*.
Figure 12B:
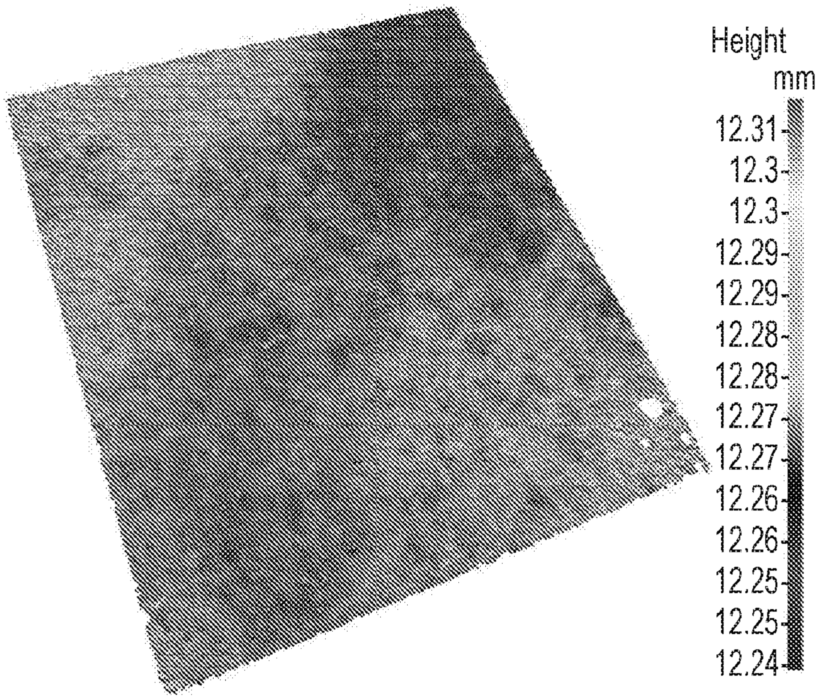
FIG. 12*b* illustrates a profilometry analysis of LbL coating (10 layers of dipping and 6 layers of spray) of FIG. 11*b*.

FIG. 12*a* shows a profilometry test on the coating composed of 16 layers with just the immersion steps and FIG. 12*b* shows a profilometry test of the LbL coating composed of 10 layers of immersion and 6 layers of spray. The roughness profile (Rq) is shown in the table below:

TABLE 2

Values of roughness profiles for dipping and combined dipping/spray coating.

| Layer Treatment | Rq [nm] |
|---|---|
| Immersion | 261.6 ± 16.8 |
| Immersion and spray combination | 232.3 ± 11.7 |

The profilometry test revealed that the coating with combination dipping and spray created a thinner layer (lower Rq as shown in the table). This is acceptable because the spray Layer by layer and the more homogenous distribution of the molecules can allow to create thinner layers compared with the immersion method.

Additional examples of charged solutions and their potential use are described in the table below:

TABLE 3

Examples of charged solutions and their potential use.

| Charged solutions | Use |
|---|---|
| PAH-Naf/PAH-PAA poly(allylamine)-Nafion/poly (acrylic acid) | mechanically responsive variable hydrophobicity film |
| DMLPEI/PAA linear N,N-dodecyl,methyl-poly(ethyleneimine)/poly (acrylic acid) | microbicidal coating |
| PEI/SA poly(ethyleneimine)/sodium alginate | anchoring layer for biosensor electrode |
| PSS/PAH poly (allylamine hydrochloride)/poly (styrene sulfonate) | bilayer component for biosensor coating controlled drug release |
| PAH/PAA poly (allylamine/poly(acrylic acid) | pH-induced controlled delivery of hydrophobic agent |
| PNIPAAm/PAA poly(N-isopropylacrylamide)/poly(acrylic acid) | stimulated drug delivery |
| PPE-EA/EGFP poly(2-aminoethyl propylene phosphate)/enhanced green fluorescent protein | prolonged gene delivery |

Various modifications to the detailed designs as described above are possible. For example, although the apparatus has been described above as rotating between different enclosure portions alternative examples may have a linear system. For example, multiple enclosure portions may be positioned laterally adjacent, with the arm on a moveable track such that the arm may move the substrate between each enclosure portion.

Although described as separate components, the retaining mechanism and top portion of the substrate holder may be integral.

Although the apparatus is described above as including one nozzle per charged solution, alternative apparatuses may include multiple nozzles for each charged solution.

Although the housing of the above described apparatus has been depicted as being formed from acrylic materials, any appropriate material may be used, for example a non-reactive metal such a stainless steel.

Although described as a 12 volt stepper motor it should be understood any appropriate motor could be used.

The atomizing spray nozzle described above may be any appropriate atomizing nozzle. For example, the atomizing nozzle may be an ultrasonic spray nozzle. However, varying designs of these nozzles which grant a LbL apparatus the ability to change its spraying profile may also be used.

It should be understood that the above described apparatus may be scaled up for manufacture of thin films on a large scale and any dimensions detailed are for example purposes only.

Although it is described in the example method that an arm may lower and raise a substrate into the charged solution reservoir, it should be understood an alternatives such as the reservoir being raised and lowered to and from the substrate are also envisaged.

The control system of the apparatus can also allow the user to choose between the spray and dip function of the machine as a single function, that is the machine can also perform just spay LbL deposition or just immersion LbL deposition.

Although the method of LbL deposition has been described throughout the specification with the immersion step as a first step followed by the spray step, it should be understood that the spray step may by the first step, followed by an immersion step.

Additionally, the method described above is intended to encompass any combination of at least one immersion step and at least one spray step. The combination of at least one immersion step and at least one spray step repeated N times until a thin film is formed that advantageously reduces the overall time to build up a layer. The method may include successive spray steps with a charged solution or first and second charged solutions. Similarly the method may include successive immersion steps in a charged solution or first and second charged solutions.

The spray step and the rinse step may be repeated 10 times, while the immersion step and the rinse step may be repeated 20 times.

Advantageously with the above described arrangement an apparatus capable of reducing waste, by catching excess sprayed solution in a reservoir, is described.

The above described arrangement provides a method and apparatus for performing a combined LbL technique. The arrangement can additionally house multiple charged solutions for layer by layer deposition allowing for the build-up of layers of varying charged solution with a single apparatus.

The above described arrangement allows for layer by layer deposition to occur with improved control of the coating homogeneity compared with previously known methods.

For the spray step contact times of the liquid containing the adsorbing molecules and the surface could be very short so that the time interval between two consecutive deposition steps can be significantly reduced, when compared to the deposition by dipping. Moreover, because drainage constantly removes a certain quantity of the excess material arriving at the surface, one can even skip the rinsing step and, thus, speed up even further the whole build-up process.

It should be understood that throughout the above description the term “dipping” and “immersion” have been used interchangeably.

It will be clear to a person skilled in the art that features described in relation to any of the embodiments described above can be applicable interchangeably between the different embodiments. The embodiments described above are examples to illustrate various features of the invention.

Throughout the description and claims of this specification, the words “comprise” and “contain” and variations of them mean “including but not limited to”, and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader’s attention is directed to all papers and documents which are filed concurrently with or previous to this specification in connection with this application and which are open to public inspection with this specification, and the contents of all such papers and documents are incorporated herein by reference.

The invention claimed is:

1. A layer-by-layer deposition apparatus for thin-film fabrication, the layer-by-layer deposition apparatus comprising:

a substrate holder for holding a substrate;

a first spray assembly for spraying a first atomized charged solution;

a first reservoir for containing the first atomized charged solution; and wherein the substrate holder is movable between a first spraying position and a first immersed position, wherein in the first spraying position the substrate holder positions the substrate substantially adjacent the first spray assembly to allow the substrate to be sprayed with the first atomized charged solution, and wherein in the first immersed position the substrate holder at least partially immerses the substrate in the first charged solution within the first reservoir, wherein the apparatus further comprises a further spray assembly for spraying a further atomized charged solution, wherein the substrate holder is movable to a further spraying position, wherein in the further spraying position the substrate holder positions the substrate substantially adjacent the further spray assembly to allow the substrate to be sprayed with the further atomized charged solution, and wherein the apparatus further comprises a further reservoir for containing the further atomized charged solution, wherein the substrate holder is movable to a further immersed position, wherein in the further immersed position the substrate holder at least partially immerses the substrate in the further charged atomized solution within the further reservoir, and wherein the layer-by-layer deposition apparatus comprises a housing configured to enclose the first spray assembly and the first reservoir of the first atomized charged solution and the further spray assembly and the further reservoir of the further atomized charged solution.

2. The apparatus of claim 1, wherein in the first spraying position the substrate holder is positioned directly above the first reservoir.

3. The apparatus of claim 1, wherein the further charged solution is of opposite charge to the first charged solution.

4. The apparatus of claim 1, wherein the apparatus further comprises an arm configured to move the substrate holder between the first spraying position and the first immersed position.

5. The apparatus of claim 4, wherein the substrate holder is rotatable in relation to the arm.

6. The apparatus of claim 4, wherein the arm is attached to the substrate holder, and wherein the arm includes a motor enclosure to which the substrate holder is attached.

7. The apparatus of claim 6, wherein the housing is formed of a bottom plate and a top plate opposite the bottom plate, wherein the top plate and the bottom plate are spaced apart by internal walls and a central enclosure, and wherein the top plate comprises cutout portions shaped to correspond to the motor enclosure, and wherein the motor enclosure and the top plate engage one another to prevent any charged solutions from escaping.

8. The apparatus of claim 1, wherein the apparatus further comprises an arm configured to move the substrate holder between the first spraying position and the first immersed position and wherein the housing is rotatable in relation to the arm.

9. The apparatus of claim 1, wherein the apparatus further comprises a controller, the controller configured to control the movement of the substrate holder.

10. The apparatus of claim 1, wherein the apparatus further comprises a rinsing bath and/or a rinsing nozzle for washing the substrate.

11. The apparatus of claim 1, wherein the apparatus further comprises a shield, the shield configured to prevent any of the atomized charged solutions from escaping the housing.

12. The apparatus of claim 1, wherein internal walls split the housing into multiple enclosure portions to prevent contamination of any of the charged solutions between the enclosure portions.

13. The apparatus of claim 1, wherein each of the further spray assembly and the further reservoir are contained within an enclosure portion of the housing.

14. The apparatus of claim 13, wherein the housing is formed of a bottom plate and a top plate opposite the bottom plate, wherein the top plate and the bottom plate are spaced apart by internal walls and a central enclosure.

* * * * *